United States Patent Office 3,598,546
Patented Aug. 10, 1971

3,598,546
PREPARING ANHYDROUS HYDRAZINE USING AN ACTIVATED ALUMINUM OXIDE DRYING AGENT
Carl D. Good, Seattle, and Donald R. Poole, Woodinville, Wash., assignors to Rocket Research Corporation of America, Redmond, Wash.
No Drawing. Filed Nov. 26, 1969, Ser. No. 880,410
Int. Cl. B01d 15/00, 15/06; C01b 21/16
U.S. Cl. 23—307
9 Claims

ABSTRACT OF THE DISCLOSURE

Hydrazine, monomethyl hydrazine, dimethyl hydrazine and other closely related hydrazine compounds are presently available as liquids containing small amounts of water (e.g. 1%) which affects their properties to a very great extent. The present invention provides a physical procedure for removing such water without heating the hydrazine and without the formation of dangerous byproducts.

---

This invention relates to the preparation of anhydrous hydrazine and closely related compounds.

Anhydrous hydrazine is presently required for a number of uses in which the presence of even the relatively small amount of water usually found in the commercially available "anhydrous" hydrazines disqualifies them from such uses. At the present time hydrazine is available as a commercial product which contains approximately one percent (1%) by weight of water.

A large number of procedures have been attempted for the removal of this water and an excellent summary of such procedures is found in chapter 3 of "The Chemistry of Hydrazine" by L. F. Audrieth and Ogg, published in 1951, by John Wiley & Sons, Inc. (New York).

As described therein, such procedures include purely chemical, purely physical, and combined chemical and physical processes. Any processes such as distillation, in which hot hydrazine vapor is generated are quite dangerous because such vapors are detonatable at pressures as low as 12 mm. Hg.

The procedure by which water is removed from water-containing hydrazine or hydrazine derivatives according to the present invention comprises bringing the liquid hydrazine into physical contact with a specially prepared high surface area alumina absorbent, for example, by permitting the liquid to trickle down through a bed of very porous alumina, which selectively absorbs the water in preference to the hydrazine and permits the dried liquid hydrazine to pass through the bed, which holds the water, thereby effecting drying of the liquid hydrazine or hydrazine derivatives.

The invention will be more fully understood from the following description of a preferred embodiment of the invention which is intended to be illustrative and not limiting the invention in any way.

The alumina used in the process of the present invention is required to have a high surface area, for example, more than 100 square meters per gram. A suitable porous alumina which is commercially available, is type RA-1, sold by the Reynolds Metals Company. Surface areas from 150 to 350 square meters per gram are common for this very porous type alumina. To insure that the alumina having the indicated high porosity will function in the intended manner, for removal of water, the alumina is heated to a temperature, between 900° F. and 1000° F. having been found suitable, the heating being carried out in a furnace in which a stream of dry nitrogen is passed over the alumina. Heating the alumina to higher temperatures causes loss of surface area and drying capacity. This treatment removes water and gases adsorbed by the alumina, which may amount to as much as 10% by weight of the initial weight of the untreated alumina. After treatment, the alumina is cooled, preferably in a dry nitrogen atmosphere and when cool, the alumina is stored in a tightly sealed storage container until it is to be used in the practice of this invention to remove water from hydrazine.

Water is removed from liquid hydrazine containing small amounts of water by passing the liquid hydrazine slowly through a column of granules of porous alumina. It has been found that the hydrazine which is eluted from the column initially has a water content which is lower than the water content of the original water containing liquid hydrazine fed into the column.

Although the affinity of the alumina for the small amount of water in the hydrazine is slight, the very high surface area of the alumina employed allows it to be an effective dryer. The capacity of alumina drying hydrazine compounds has been observed to be about 0.3% (.00304 gram of water per gram of alumina), and thus about 330 grams of alumina per gram of water. The quantity of hydrazine which can be dehydrated per pound of alumina then depends on the water content of the hydrazine. As indicated in the results reported below, the alumina gradually becomes less effective in removing water and must be replaced. The alumina removed from the column is reactivated by heating it to between about 900 to 1000° F. in a flowing stream of dry nitrogen.

If the removal of water is not sufficient to dry the hydrazine to the desired extent, the partially dried liquid hydrazine can be passed through one or more additional beds of alumina until the desired "dryness" is achieved.

EXAMPLE

A bed of 296 grams of granular alumina was packed into a glass Pyrex tube 22 mm. I.D. and 110 cm. long after the 14 to 28 granular alumina (Reynolds, RA-1) had been heated in dry nitrogen to remove adsorbed liquids and gases. The bed was 90 cm. long in the tube. One end of the Pyrex tube was connected to a receiver flask and after flushing the alumina packed tube and receiver flask with dried nitrogen, 450 ml. of liquid hydrazine containing 0.92% water was allowed to trickle slowly down through the column and was collected in the receiver flask, which was continually purged with dry nitrogen. Samples of the hydrazine were taken with the following results, tabulated in Table 1.

TABLE 1

| Sample No.: | Volume eluted (ml.) | Cumulative volume (ml.) | Percent $H_2O$ in sample |
|---|---|---|---|
| 1 | 2 | 2 | 0.27 |
| 2 | 2 | 4 | 0.24 |
| 3 | 4 | 8 | 0.14 |
| 4 | 8 | 16 | 0.07 |
| 5 | 11 | 27 | 0.05 |
| 6 | 7 | 34 | 0.06 |
| 7 | 13 | 47 | 0.06 |
| 8 | 11 | 58 | 0.06 |
| 9 | 11 | 69 | 0.08 |
| 10 | 10 | 79 | 0.08 |
| 11 | 14 | 93 | 0.08 |
| 12 | 14 | 107 | 0.10 |
| 13 | 12 | 119 | 0.16 |
| 14 | 13 | 132 | 0.16 |
| 15 | 14 | 146 | 0.25 |
| 16 | 28 | 174 | 0.34 |
| 17 | 13 | 187 | 0.34 |
| 18 | 15 | 202 | 0.45 |
| 19 | 13 | 215 | 0.48 |
| 20 | 15 | 230 | 0.49 |
| 21 | 15 | 245 | 0.53 |
| 22 | 19 | 264 | 0.55 |
| 23 | 17 | 281 | 0.57 |
| 24 | 22 | 303 | 0.61 |

For many purposes only the first 100 ml. of product would be "usable" and the next 200 ml. would be recycled. For other purposes, a cut-off at 0.30% or even 0.40% H$_2$O might be "usable," and a smaller fraction would be recycled. About 130 ml. of the 450 ml. used were lost in the above example.

With larger diameter columns, the effective capacity of the column would probably be greater due to diminished wall effects, channeling and handling exposure.

With lower water contents in the hydrazine being processed (e.g. when processing a recycled fraction), the efficiency of the operation will be significantly greater.

It is believed that the advantages of the present process, as compared with those described in "The Chemistry of Hydrazine" will be readily apparent from the above results. No heated vapors are formed, no hazardous by-products are formed, inexpensive readily available raw materials are used and may be discarded if regeneration is burdensome.

What is claimed is:

1. A process for substantially lowering the water content of liquid hydrazine containing small amounts of water which comprises:
    passing the water containing liquid hydrazine through a porous aluminum oxide adsorbent material which has been activated by drying and which has a surface area of at least 100 square meters per gram;
    retaining the liquid and adsorbent material in contact for a time sufficient to lower the water content of the liquid hydrazine at least to substantially below about 1% by weight; and
    recovering said liquid hydrazine with a substantially lowered water content as compared with the liquid hydrazine originally passed through the porous alumina adsorbent.

2. The process of claim 1 wherein the step of bringing the liquid hydrazine into physical contact with a porous aluminum oxide adsorbent comprises trickling the liquid through a columnar bed of alumina.

3. The process of claim 1 including the step of reactivating the porous aluminum oxide adsorbent material by heating it in a flowing stream of dry nitrogen to between 900 to 1000° F.

4. The process of claim 2 including the step of passing the liquid hydrazine through at least one more additional bed of porous activated aluminum oxide adsorbent.

5. The process as recited in claim 1, wherein the liquid hydrazine being processed has a water content no greater than about 1% by weight.

6. The process as recited in claim 5, wherein the water content of the liquid hydrazine being processed becomes lowered to about ½% by weight.

7. The process as recited in claim 5, wherein the water content of the liquid hydrazine being processed becomes lowered to less than about ½% by weight.

8. The process as recited in claim 1, wherein the water content of the liquid hydrazine being processed becomes lowered to no greater than about ½% by weight.

9. The process as recited in claim 1, wherein the water content of the liquid hydrazine being processed becomes lowered to no greater than about 0.1% by weight.

References Cited

UNITED STATES PATENTS

| | | | |
|---|---|---|---|
| 2,199,258 | 4/1940 | Gray | 210—24X |
| 2,767,803 | 10/1956 | Henry | 210—502X |
| 2,805,129 | 9/1957 | Haller | 23—190 |
| 2,917,369 | 12/1959 | Osborg | 23—190 |
| 3,138,545 | 6/1964 | Reed | 203—14 |
| 3,161,488 | 12/1964 | Eastwood | 210—24X |
| 3,235,089 | 2/1966 | Burroughs | 210—502X |
| 3,357,799 | 12/1967 | Klingelhoefer | 23—312X |

FOREIGN PATENTS

| | | | |
|---|---|---|---|
| 522,742 | 3/1956 | Canada | 23—190 |
| 523,848 | 4/1956 | Canada | 23—190 |
| 1,434,101 | 2/1966 | France | 23—190 |
| 1,141,342 | 1/1969 | Great Britain | 23—190 |

OTHER REFERENCES

Barry, Chemical Engineering, Feb. 8, 1960, vol. 67, #3, pp. 105 to 110.

Pannetier, Chemical Abstracts, vol. 48, #22, Nov. 25, 1954, column 14133.

Fairmount, Chem. Eng. News, Mar. 2, 1953, pp. 880 to 882.

Newsome, Alumina Properties, Alcoa, 1960, pp. 53 to 58.

Audrieth, Chemistry of Hydrazine, Wiley and Sons, N.Y., 1951, pp. 42 to 51.

NORMAN YUDKOFF, Primary Examiner

S. J. EMERY, Assistant Examiner

U.S. Cl. X.R.

23—312, 190; 270—24; 252—410; 208—188